United States Patent
Hodson et al.

(10) Patent No.: US 8,612,538 B2
(45) Date of Patent: Dec. 17, 2013

(54) SYSTEM AND METHOD FOR UPGRADING TELEMONITOR UNIT FIRMWARE

(75) Inventors: Robert P. Hodson, Hartford, WI (US); Keith S. Becker, Oconomowoc, WI (US)

(73) Assignee: Honeywell International Inc., Morristown, NJ (US)

( * ) Notice: Subject to any disclaimer, the term of this patent is extended or adjusted under 35 U.S.C. 154(b) by 954 days.

(21) Appl. No.: 11/842,255

(22) Filed: Aug. 21, 2007

(65) Prior Publication Data

US 2009/0055512 A1 Feb. 26, 2009

(51) Int. Cl.
*G06F 15/16* (2006.01)

(52) U.S. Cl.
USPC .............. 709/217; 709/220; 709/221

(58) Field of Classification Search
USPC ........................................ 709/223
See application file for complete search history.

(56) References Cited

U.S. PATENT DOCUMENTS

| | | | |
|---|---|---|---|
| 6,402,691 B1 | 6/2002 | Peddicord | |
| 6,546,492 B1 | 4/2003 | Walker et al. | |
| 6,595,929 B2 | 7/2003 | Stivoric et al. | |
| 6,614,804 B1 * | 9/2003 | McFadden et al. | 370/468 |
| 6,930,785 B1 | 8/2005 | Weyand et al. | |
| 7,093,244 B2 * | 8/2006 | Lajoie et al. | 717/168 |
| 2003/0164762 A1 | 9/2003 | Ridley | |
| 2003/0186689 A1 * | 10/2003 | Herle et al. | 455/418 |
| 2005/0120040 A1 * | 6/2005 | Williams et al. | 707/102 |
| 2005/0228874 A1 * | 10/2005 | Edgett et al. | 709/220 |
| 2006/0026205 A1 * | 2/2006 | Butterfield | 707/104.1 |
| 2006/0218545 A1 * | 9/2006 | Taguchi | 717/168 |
| 2006/0285651 A1 | 12/2006 | Tice | |
| 2007/0004970 A1 | 1/2007 | Tice | |
| 2007/0024439 A1 | 2/2007 | Tice | |
| 2007/0150482 A1 * | 6/2007 | Taylor et al. | 707/10 |
| 2008/0016192 A1 * | 1/2008 | Smith et al. | 709/223 |
| 2008/0216066 A1 * | 9/2008 | Oh | 717/173 |
| 2009/0157058 A1 * | 6/2009 | Ferren et al. | 604/891.1 |

OTHER PUBLICATIONS

International Search Report and Written Opinion of the International Searching Authority, mailed Nov. 3, 2008 corresponding to International application No. PCT/US08/73600.

* cited by examiner

*Primary Examiner* — Mohamed Ibrahim
(74) *Attorney, Agent, or Firm* — Husch Blackwell LLP

(57) ABSTRACT

Systems and methods minimize loading of servers which automatically provide upgrades to downstream processors minimize server loading by randomly distributing the upgrade requests. Each of the downstream processors can establish its own randomized next time for an upgrade. Upgrade time intervals can be limited to off-peak evening and weekend hours.

19 Claims, 2 Drawing Sheets

SYSTEM AND METHOD FOR UPGRADING TELEMONITOR UNIT FIRMWARE

FIELD

The invention pertains to systems and methods to upgrade firmware that controls the operation of telemonitors. More particularly, the invention pertains to such systems and methods which randomly temporally distribute respective upgrade times so as to avoid overloading an upgrade server.

BACKGROUND

Various types of telemonitoring systems for keeping track of patient health conditions are known. These include U.S. Pat. No. 6,402,691 B1 entitled In-home Patient Monitoring System issued Jun. 11, 2002, Published application No. 2006/0285651 A1 entitled Monitoring System With Speech Recognition published Dec. 21, 2006, No. 2007/0004970 A1 entitled Trend Monitoring System With Multiple Access Levels published Jan. 4, 2007, and No. 2007/0024439A1 entitled Monitoring System for a Residence published Feb. 1, 2007. All of the above have been acquired or assigned to the Assignee hereof and are incorporated by reference.

Monitoring systems, as noted above, benefit from periodic updates to add or support new features, fix software problems or add additional media content. A convenient and cost effective way to implement such upgrades is to use an upgrade server, which might be displaced from the respective monitors, which periodically downloads the upgrade.

Where thousands of monitors are seeking upgrades, server overloads or slowdowns in service can result. There is thus a continuing need to be able to provide large numbers of upgrades to remote sites requesting same without causing service slowdowns or system crashes.

It would also be desirable to find a way to avoid the above noted problems without requiring hardware upgrades and which might be incorporated into a firmware upgrade of existing monitors.

DETAILED DESCRIPTION

Figure 1:
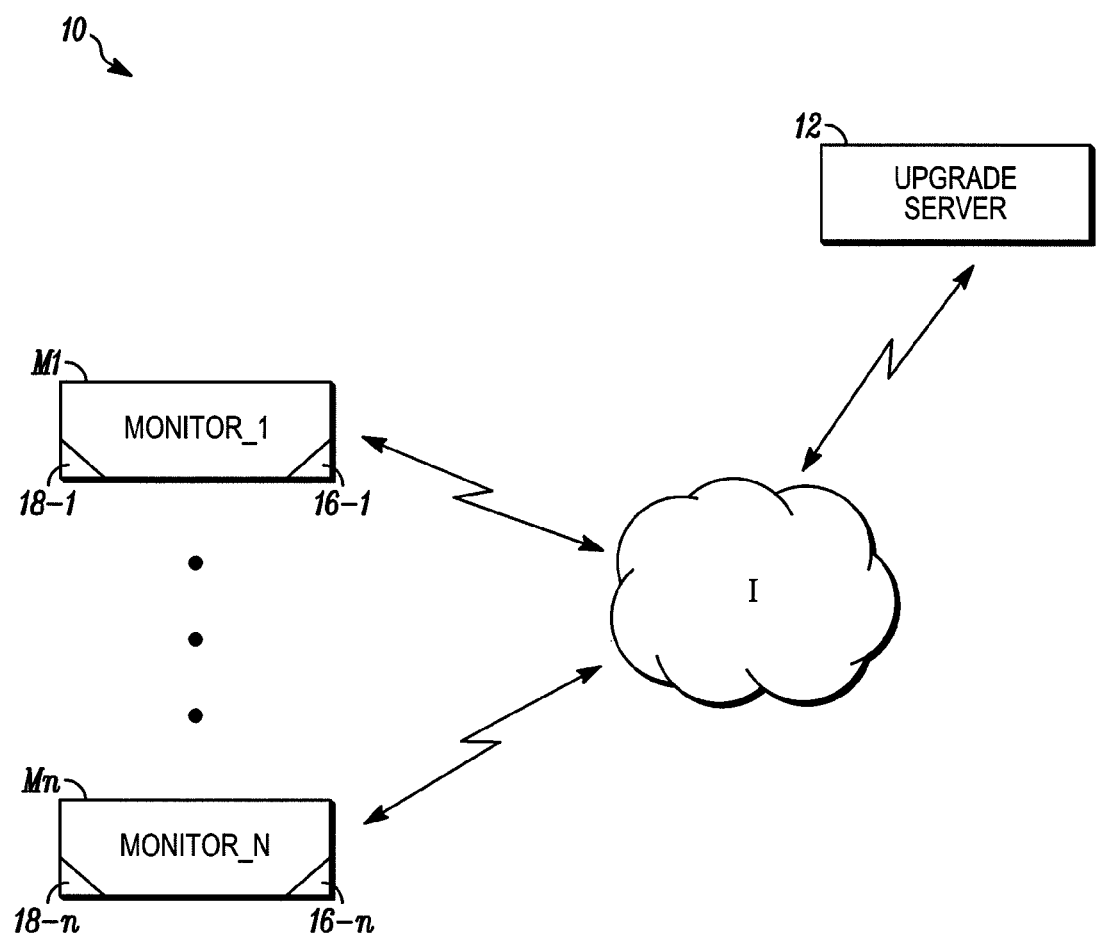
FIG. 1 is a block diagram of a system which embodies the present invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

In a disclosed embodiment of the invention, the load of an upgrade providing unit, for example, an upgrade server, can be distributed by randomizing the time an upgrade seeking device request same from the server. Available time intervals can be restricted to off-peak hours such as nights and weekends.

In one aspect of the invention, a monitoring unit can randomize a scheduled update so that it falls within an off-peak time. The monitoring unit can carry our local system maintenance, for example, deleting expired records, fixing or eliminating detected database errors, compacting the data in the database and deleting old logged errors. The unit can then, at the predetermined time, automatically couple, via a computer network, such as the Internet, to a designated upgrade server and request an upgrade.

In response to a communication from the unit, the server can notify the unit as to its expected upgrade level. The unit can then download any needed file(s) to implement the upgrade. The downloaded files can be installed for execution in the receiving unit to complete the process.

In FIG. 1 a system 10 incorporates a plurality of monitors of various types, such as M1 . . . Mn (which could run into thousands of units). The monitors Mi carry out their routine functions as scheduled. They can communicate via a computer network, such as the Internet I, or a local area network, with an upgrade server 12.

Server 12 can provide one or more files as needed to automatically upgrade one or more of the monitors such as Mi. The monitors, such as Mi, operate independently of one another and can establish their own respective time(s) to seek one or more upgrades.

Figure 2:
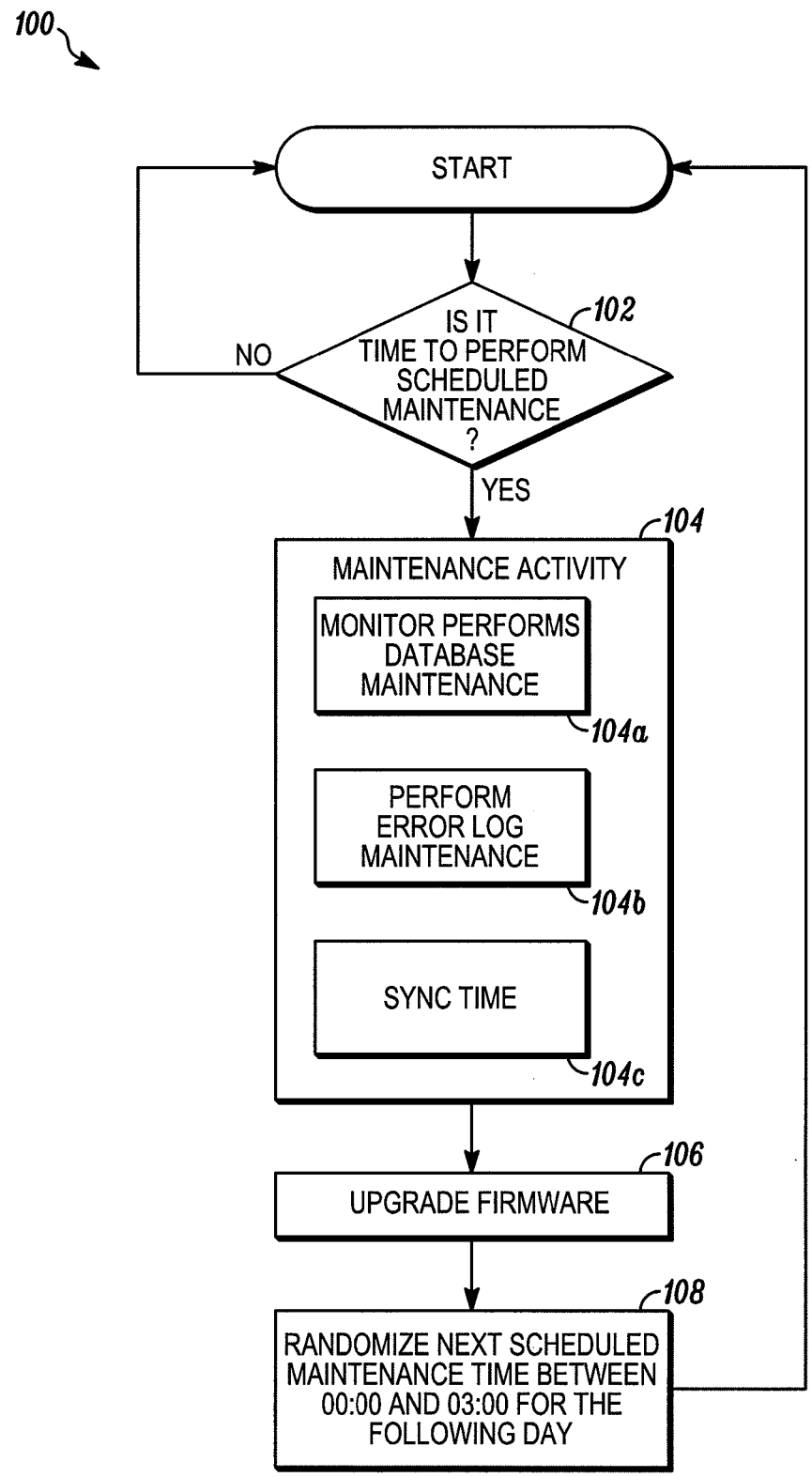
FIG. 2 is a flow diagram of a method in accordance with the present invention.

FIG. 2 illustrates a process 100 that can be independently carried out by the monitors Mi so as to minimize loading of the server 12 with upgrade requests. The process 100 can be implemented at each monitor, such as Mi by respective maintenance and scheduling software such as 16-1 . . . 16-$i$ . . . 16-$n$ embodied on a non-transitory computer readable medium by one or more local programmable processors 18-$i$ as would be understood by those of skill in the art.

With respect to FIG. 2, a respective monitor such as Mi determines if it time to perform Scheduled Maintenance, as at 102. If so, it carries out such activity as at 104. Representative maintenance activities can include, without limitation, database maintenance as at 104$a$, error log maintenance as at 104$b$ and synchronization as at 104$c$.

One or more upgrade files can be requested from server 12 as at 106. Down loaded files can then be installed at the unit Mi to be executed by the one or more local processors.

Finally, a randomized next maintenance time can be established at an off-peak time as at 108. Those of skill in the art will understand that a variety of processes could be executed to establish the next scheduled maintenance time. For example, scheduled maintenance and upgrading the local firmware can be carried out on a daily, or weekly, basis. Randomization can be implemented, for example by adding a random number to a current download time to determine the next download time. Other variations come within the spirit and scope of the invention. Additional parameters can include limiting download times to off-peak time intervals or to weekends. All such variations come within the spirit and scope of the invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A system comprising:
   a designated upgrade server;
   a plurality of in-home monitoring units each operating independently of one another, with each of the units including firmware and circuitry for establishing a randomly varying download requesting parameter; and
   a download processor through which each of the units automatically couples with the designated upgrade server via a computer network in accordance with the respective randomly varying download requesting parameter of the unit to request a download of at least one upgrade file, wherein the designated upgrade server notifies the processor of an expected upgrade level, the processor downloads any needed files in accordance with the expected upgrade level and the downloaded files automatically upgrade the firmware of the unit and wherein upon completion of the upgrade the firmware and circuitry randomly establishes a time for a next download by adding a random number to a current download time.

2. A system as in claim 1 where the circuitry for establishing includes a programmable processor and executable instructions.

3. A system as in claim 2 where the executable instructions randomly vary the download requesting parameter so as to establish a randomly varying download time for the respective unit.

4. A system as in claim 3 where the executable instructions carry out local maintenance functions prior to seeking a download.

5. A system as in claim 4 where subsequent to seeking a download, a randomized next time for carrying out a maintenance activity is established.

6. A system as in claim 2 with the executable instructions determining if a time to perform scheduled maintenance has arrived; and
executable instructions, responding to arrival of a scheduled maintenance time, to automatically carry out a local maintenance activity.

7. A system as in claim 6 which includes executable instructions to randomly determine a subsequent time to perform scheduled maintenance, and, instructions to request a download from a displaced source at or about the scheduled maintenance time.

8. A system as in claim 1 where the randomly varying parameter corresponds to one of a randomly varying download time, or a randomly varying download time interval.

9. A system as in claim 1 where the units include circuitry for communicating with the download processor via a computer network.

10. A method of operating a plurality of in-home monitoring units comprising:
each of the plurality of in-home monitoring units determining if a predetermined time to carry out an automated maintenance function has been reached for a respective unit controlled by firmware;
responsive to the determining, each of the plurality of monitoring units carrying out an automatic maintenance function at the predetermined time;
each of the plurality of monitoring units automatically coupling to an upgrade server;
the upgrade server notifying each of the plurality of monitoring units of an expected upgrade level for the unit;
each of the plurality of monitoring units requesting a download of at least one needed upgrade file from a displaced source in accordance with the expected upgrade level;
installing the at least one upgrade file in the firmware; and
at the time of the installation of the at least one upgrade file in the firmware determining a randomly varying time to carry out the next automated maintenance function by adding a random number to a current download time.

11. A method as in claim 10 which includes providing a plurality of independently operating units.

12. A method as in claim 11 which includes coupling members of the plurality to the displaced source.

13. A method as in claim 12 where members of the plurality independently determine a respective randomly varying time to carry out the next automated maintenance function associated with a respective unit.

14. A method as in claim 11 wherein at least lease some of the operating unit monitor physiological conditions of respective individuals.

15. A method as in claim 10 which includes providing the displaced source of upgrades.

16. A method as in claim 15 which includes coupling the unit to the displaced source via a computer network.

17. A computer program product embodied on a non-transitory computer-readable medium and executable by a processor of an in-home monitoring unit controlled by firmware, the computer program comprising:
executable instructions for determining if a time to perform scheduled maintenance of the firmware has arrived;
executable instructions, responding to arrival of a scheduled maintenance time, to automatically carry out a local maintenance activity;
executable instructions that automatically couple to a displaced source via a computer network to request an upgrade;
executable instructions that receives notification from the displace source of an expected upgrade level;
executable instructions to request a download of at least one upgrade file in accordance with the expected upgrade level from the displaced source at or about the scheduled maintenance time;
executable instructions that install the at least one upgrade file in the firmware; and
executable instructions to randomly determine at a time of installation of the at least one upgrade file a subsequent time to perform scheduled maintenance by adding a random number to a currently scheduled maintenance time.

18. A computer program product as in claim 17 where the executable instructions to randomly determine a subsequent time to perform scheduled maintenance also establish a randomly varying time for the unit to request an upgrade from the displaced source.

19. A computer program as in claim 17 which includes executable instructions to sense at least one physiological condition of a respective individual.

* * * * *